(12) United States Patent
Cai et al.

(10) Patent No.: US 9,577,521 B2
(45) Date of Patent: Feb. 21, 2017

(54) AVERAGE CURRENT CONTROL FOR A SWITCHED POWER CONVERTER

(71) Applicant: Atmel Corporation, San Jose, CA (US)

(72) Inventors: Charles Cai, Mather, CA (US); Wai-Keung Peter Cheng, Union City, CA (US)

(73) Assignee: Atmel Corporation, San Jose, CA (US)

( * ) Notice: Subject to any disclaimer, the term of this patent is extended or adjusted under 35 U.S.C. 154(b) by 0 days.

(21) Appl. No.: 14/838,690

(22) Filed: Aug. 28, 2015

(65) Prior Publication Data

US 2015/0372593 A1    Dec. 24, 2015

Related U.S. Application Data

(63) Continuation of application No. 13/764,061, filed on Feb. 11, 2013, now Pat. No. 9,148,925.

(51) Int. Cl.
*H05B 33/08* (2006.01)
*H02M 3/156* (2006.01)

(52) U.S. Cl.
CPC ......... *H02M 3/156* (2013.01); *H05B 33/0818* (2013.01); *H05B 33/0836* (2013.01); *Y02B 20/347* (2013.01)

(58) Field of Classification Search
CPC . H05B 33/0818; H05B 33/0836; H02M 3/156
USPC ......... 315/291, 294, 297, 307; 323/281, 307
See application file for complete search history.

(56) References Cited

U.S. PATENT DOCUMENTS

| | | | |
|---|---|---|---|
| 7,795,850 B2 | 9/2010 | Burstein et al. | |
| 2005/0073287 A1* | 4/2005 | Ball | G05F 1/40 323/281 |
| 2011/0234122 A1 | 9/2011 | Yu et al. | |
| 2012/0025737 A1* | 2/2012 | Kikuchi | G05F 3/262 315/307 |
| 2014/0028205 A1* | 1/2014 | Lischka | H05B 33/0818 315/193 |

* cited by examiner

*Primary Examiner* — Douglas W Owens
*Assistant Examiner* — Jonathan Cooper
(74) *Attorney, Agent, or Firm* — Fish & Richardson P.C.

(57) ABSTRACT

A circuit for controlling a switch in a power converter in which peak current is regulated to achieve a specified average current through a load. Control logic is operable to monitor a voltage across a sensing resistor such that when the voltage across the sensing resistor reaches or exceeds a threshold value, the control logic generates a signal that causes a switch to be turned OFF.

11 Claims, 5 Drawing Sheets

AVERAGE CURRENT CONTROL FOR A SWITCHED POWER CONVERTER

CLAIM OF PRIORITY

This application is a continuation and claims priority to U.S. patent application Ser. No. 13/764,061, filed on Feb. 11, 2013, the entire contents of which are hereby incorporated by reference.

FIELD OF THE DISCLOSURE

The present disclosure relates to average current control for a switched power converter.

BACKGROUND

Switched power converters, such as Buck converters, can convert an input power to an output power so as to drive a load with specified voltage or current values. There are various topologies to control the converter output. In some applications, such as light emitting diode (LED) lighting applications, it may be desirable to control the average output current flowing through the LED load.

Some converters include a control loop to regulate the average output current. The control loop may include sensing circuitry to sense the average output current, an error amplifier to amplify the signal from sensing circuitry, and control logic to adjust the pulse width modulation (PWM) pulse duty cycle of the power switch. To ensure that the loop is stable, a compensation network typically is needed. Furthermore, because the loop has limited bandwidth (e.g., in the kHz range), there sometimes is a delay in the output response when there is a sudden change of input power. These factors can limit the transient response of the power converter.

SUMMARY

The present disclosure describes circuits for controlling a power converter in which peak current is regulated to achieve a specified average current through a load. For example, in one aspect, a circuit includes a first input to receive a voltage corresponding to a pre-specified target average current through the load, and a second input to receive a voltage corresponding to a voltage across a sensing resistor immediately after the switch turns ON. The circuit generates a threshold value that is approximately equal to twice the voltage corresponding to the pre-specified target average current through the load, minus the voltage corresponding to a non-zero voltage across the sensing resistor just after the switch turns ON. Control logic is operable to monitor a voltage across the sensing resistor such that when the voltage across the sensing resistor reaches or exceeds the threshold value, the control logic generates a signal that causes the switch to be turned OFF. The disclosure also describes a power converter that includes such a circuit.

In another aspect, the disclosure describes a method of controlling a switch in a power converter in which peak current is regulated to achieve a specified average current through a load. The method includes receiving a voltage corresponding to a target average current through the load, and receiving a voltage corresponding to a voltage across a sensing resistor immediately after the switch turns ON. A signal representing a threshold value is generated and is approximately equal to twice the voltage corresponding to the pre-specified target average current through the load, minus the voltage corresponding to the voltage across the sensing resistor just after the switch turns ON. The method includes monitoring a voltage across the sensing resistor, and generating a signal that causes the switch to be turned OFF in response to detecting that the voltage across the sensing resistor has exceeded the threshold value.

Some implementations can achieve various advantages, such as obviating the need for a conventional control loop and compensation circuitry. Thus, in some implementations, design and application complexity can be reduced. Furthermore, some implementations can have a fast transient response such that average current control can be achieved within one switching cycle.

Other aspect, features and advantages will be readily apparent from the following detailed description, the accompanying drawings, and the claims.

DETAILED DESCRIPTION

This disclosure describes average current control for a switched power converter in which peak current is regulated to achieve a desired average current through a load. Although the techniques and circuits described here can be particularly useful where the load includes one or more light emitting diodes (LEDs), they also can be used in connection with other applications in which current through a load needs to be regulated.

Figure 1:
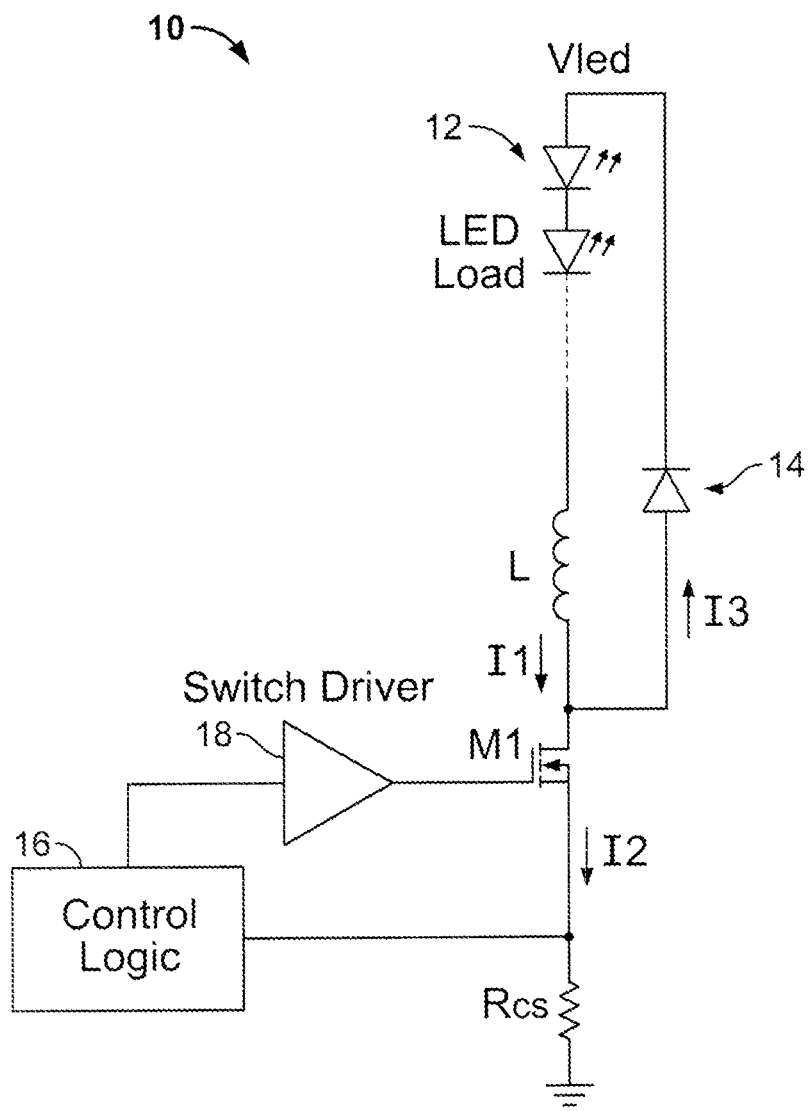
FIG. 1 illustrates an example of a switched power converter circuit coupled to a load.

As illustrated in FIG. 1, a floating Buck converter 10 is electrically coupled to one end of an inductive element (e.g., inductor L), which is connected in series with a string of one or more LEDs 12 (i.e., the load). A diode 14 is coupled in parallel between a second end of inductor L and the other end of the LED string. The other end of inductor L also is coupled to the drain of a switching transistor M1. The source of transistor M1 is coupled to ground through a sensing resistor Rcs.

The node between the source of transistor M1 and sensing resistor Rcs is coupled to control logic 16, which controls a switch driver 18 that drives the gate of transistor M1. When transistor M1 is ON, current flows through sensing resistor Rcs. On the other hand, when transistor M1 is OFF, current flows through diode 14. As explained in greater detail below, control logic 16 uses a target average current value (AvgRef/Rcs) and a sensed low current value (ValRef/Rcs) flowing through sensing resistor Rcs to obtain a peak current value (PkRef/Rcs), where AvgRef, ValRef and PkRef represent voltage values. When the current flowing through sensing resistor Rcs exceeds the peak current value (PkRef/Rcs), control logic 16 generates a control signal to cause transistor M1 to turn OFF. In particular, control logic 16 is operable to monitor the voltage across sensing resistor Rcs such that when the voltage exceeds PkRef, the control logic generates a signal that causes transistor to turn OFF. As explained below, control logic 16 can control the turning OFF of transistor M1 so that the average current flowing through the LED load 12 is about equal to the target average current value (AvgRef/Rcs), which can be chosen by the user.

Figure 2A:
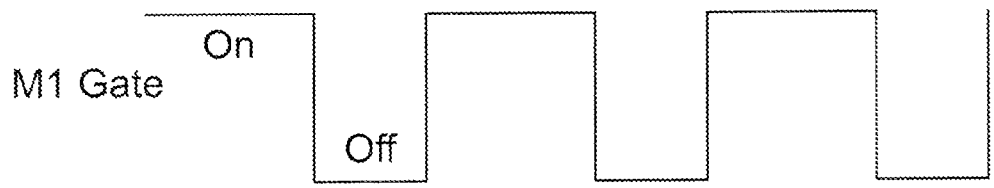
FIGS. 2A through 2D illustrate examples of waveforms in the circuit of FIG. 1.
Figure 2B:
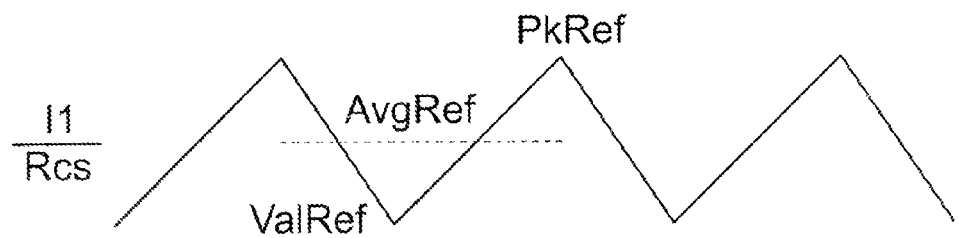
Figure 2C:
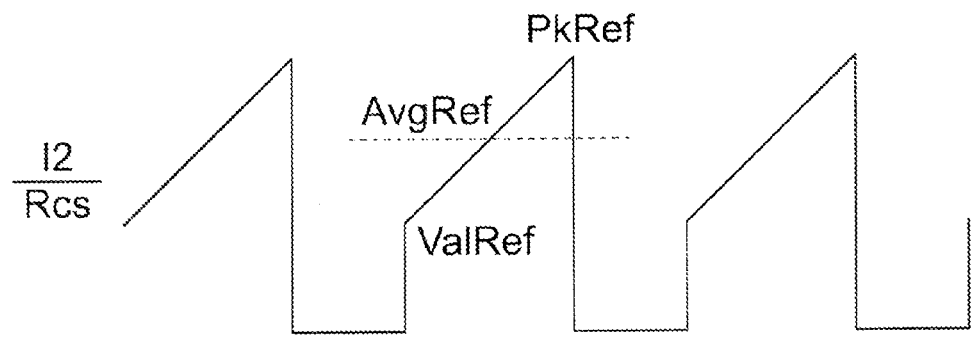
Figure 2D:
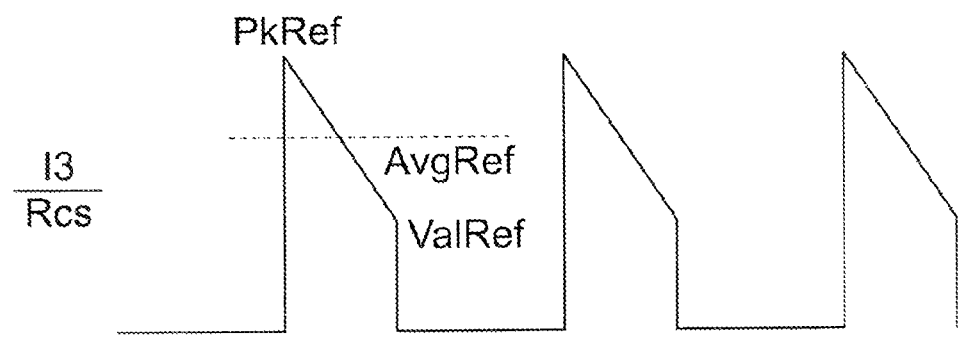

The following paragraphs, together with FIGS. 2A-2D, describe examples of waveforms for Buck converter 10. FIG. 2A illustrates an example of the waveform (e.g., voltage) on the gate of transistor M1. FIGS. 2B, 2C and 2D illustrate, respectively, corresponding examples of voltage waveforms in circuit 10, where I1 represents the current through inductor L, I2 represents the current through sensing resistor Rcs, and I3 represents the current through diode 14. Thus, the waveform of FIG. 2C represents an example of the voltage at the node between resistor Rcs and the source of transistor M1. This relative value of this voltage can be measured, for example, using a comparator in control logic 16.

When switching transistor M1 is ON, current flows from node Vled through LEDs 12, inductor L and sensing resistor Rcs to ground. In this case, the current I1 flowing through inductor L is equal to the current I2 flowing through sensing resistor Rcs. When transistor M1 is OFF, current flows from node Vled through LEDs 12, inductor L and diode 14 back to node Vled. In this case, the current I1 flowing through inductor L is equal to current I3 flowing through diode 14. Control logic 16 controls whether transistor M1 is turned ON or OFF.

When switch M1 turns ON, the current I1 flowing through sensing resistor Rcs increases almost immediately from zero to ValRef/Rcs, which is the current flowing through inductor L. The current I1 flowing through sensing resistor Rcs increases substantially linearly until it reaches a peak value PkRef/Rcs, which triggers control logic 16 to turn OFF switch M1. To regulate the average current AvgRef/Rcs through sensing resistor Rcs, which also is the average current flowing through inductor L and LED load 12, control logic 16 includes circuitry to generate a voltage value for PkRef that will cause the average current AvgRef/Rcs to take on the desired value (e.g., a value set or specified by the user).

From FIGS. 2B through 2D, it is apparent that AvgRef=½*(ValRef+PkRef). Thus, PkRef=(2*AvgRef)−ValRef. As noted above, the average current value AvgRef/Rcs (or the corresponding voltage value AvgRef) can be user-defined and can be set to a value to which the current that flows through the load is to be regulated. The ValRef value (i.e., the voltage across sensing resistor Rcs immediately after switch M1 is turned ON) can be obtained, for example, by a sample-and-hold circuit in control logic 16. The PkRef value can be obtained using circuitry that generates a voltage value of [(2*AvgRef)−ValRef] as an output based on the user-defined AvgRef value and the sensed ValRef value. The PkRef value then can be set as a threshold value of control logic 16 such that when the sensed voltage across resistor Rcs reaches (or exceeds) the threshold value, it causes transistor M1 to be turned OFF. Control logic 16 can include, for example, a comparator to compare the sensed voltage across resistor Rcs to the threshold value PkRef. In this manner, the average current flowing through the LED load 12 will be substantially equal to the user-defined AvgRef/Rcs value. The duration for which transistor M1 remains OFF can be set, for example, to a fixed amount of time using a RC circuit or digital circuitry.

Figure 3A:
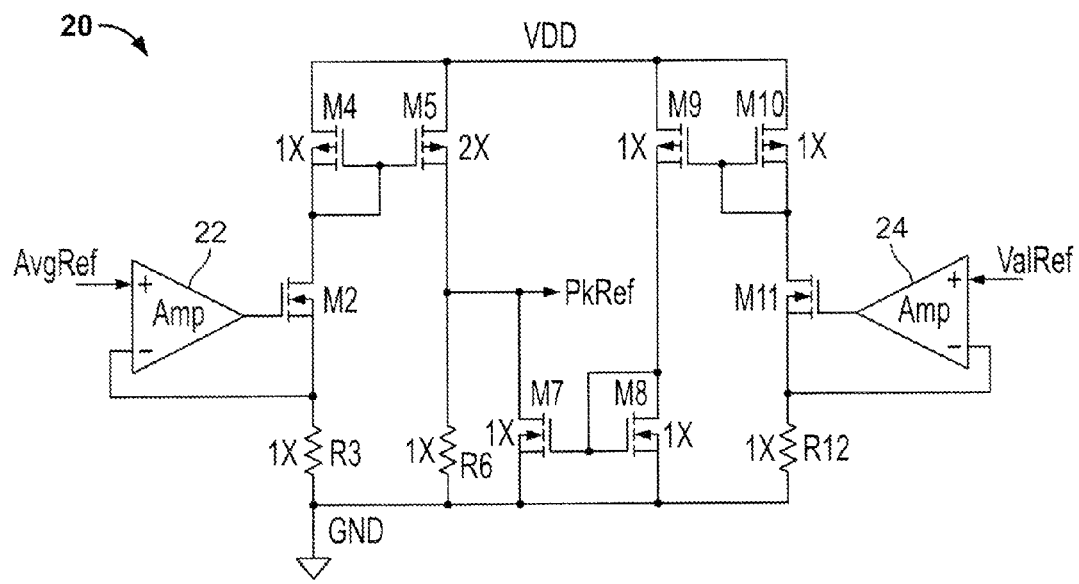
FIGS. 3A and 3B illustrate a first example of a circuit for generating a threshold value to control the average current through the load in accordance with a user-specified value.

FIG. 3A illustrates a first circuit 20 for generating a PkRef voltage value based on a user-defined AvgRef voltage value and a sensed ValRef voltage value. Depending on the implementation, a user can specify the target average current either by directly specifying the desired average current value (AvgRef/Rcs) or by specifying the corresponding voltage value (AvgRef). In the illustrated example, the user-defined AvgRef value is provided to the positive (+) input of a first amplifier 22, and the sensed ValRef value is provided to the positive (+) input of a second amplifier 24.

The output of first amplifier 22 is coupled to the gate of an NMOS transistor M2, whose source is coupled to ground through a resistor R3. The node between the source of transistor M2 and resistor R3 is coupled to the negative (−) input of first amplifier 22. The drain of transistor M2 is coupled to a first current mirror formed by PMOS transistors M4 and M5. The output of the first current mirror (i.e., the drain of transistor M5) is coupled to ground through resistor R6.

The output of second amplifier 24 is coupled to the gate of an NMOS transistor M11, whose source is coupled to ground through a resistor R12. The node between the source of transistor M11 and resistor R12 is coupled to the negative (−) input of second amplifier 24. The drain of transistor M11 is coupled to a second current mirror formed by PMOS transistors M9 and M10. The output of the second current mirror (i.e., the drain of transistor M9) is coupled to a third current mirror formed by NMOS transistors M7 and M8. The output of the third current mirror (i.e., the drain of transistor M7) is coupled to the output of the second current mirror (i.e., the drain of transistor M5). The PkRef value is obtained from the node between the first and third current mirrors (i.e., the node connecting the drains of transistors M5 and M7).

In FIG. 3A, the values "1×" and "2×" indicate the relative sizes of the transistors and the relative sizes of the resistors. Thus, for example, transistors M4, M7, M8, M9 and M10 have approximately the same size, whereas transistor M5 is about twice as large. Likewise, resistors R3, R6 and R12 can have substantially the same resistance as one another, which in the illustrated example is assumed to be R. The circuit 20 generates an output voltage PkRef equal (or about equal) to [(2*AvgRef)−ValRef].

Figure 3B:
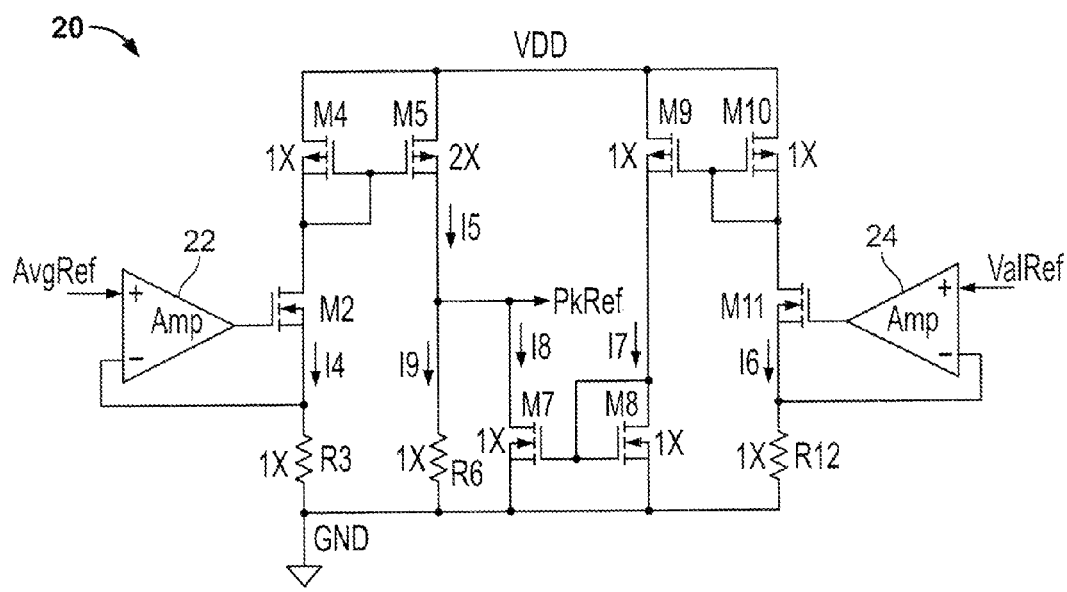

FIG. 3B illustrates further details of operation of the circuit of FIG. 3A. In particular, FIG. 3B illustrates various currents that are generated in the circuit. For example, first amplifier 22, transistor M2 and resistor R3 collectively generate current I4, where I4=(AvgRef/R). First current mirror (i.e., transistors M4 and M5) generates current I5, where I5=2*I4=2*(AvgRef/R).

Additionally, second amplifier 24, transistor M11 and resistor R12 collectively generate current I6, where I6=ValRef/R. Second current mirror (i.e., transistors M9 and M10) generates current I7, where I7=I6, and third current mirror (i.e., transistors M7 and M8) generates current I8, where I8=I7=I6=ValRef/R. Transistors M5 and M7 collectively generate current I9, where I9=I5−I8=(2*AvgRef−ValRef)/R. The voltage across resistor R6 is thus PkRef=I9*R=2*AvgRef−ValRef.

The voltage value PkRef from FIG. 3A (or FIG. 3B) can be used by control logic 16 as the threshold value to determine when to turn off transistor M1 (see FIG. 1). In particular, as explained above, when control logic 16 detects that the voltage across sensing resistor Rcs reaches the value PkRef, control logic 16 turns off transistor M1, thus ensuring that the average current flowing through the LED load 12 is substantially equal to the user-defined target AvgRef/Rcs value.

Figure 4A:
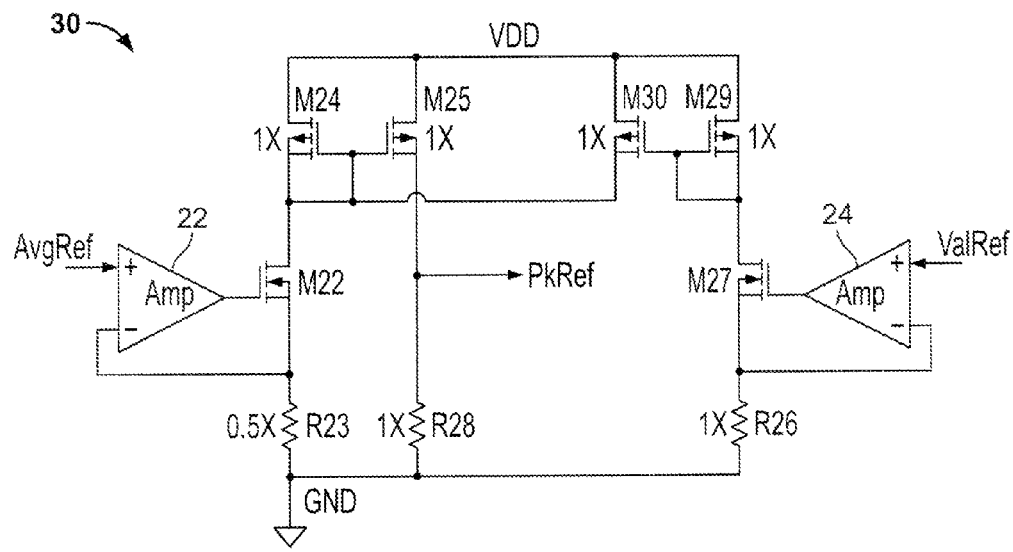
FIGS. 4A and 4B illustrate a second example of a circuit for generating a threshold value to control the average current through the load in accordance with a user-specified value.

FIG. 4A illustrates a second circuit 30 for generating a PkRef voltage value based on a user-defined AvgRef voltage value and a sensed ValRef voltage value. Here too, depending on the implementation, a user can specify the target average current either by directly specifying the desired target average current value (AvgRef/Rcs) or by specifying the corresponding voltage value (AvgRef). In the illustrated example, the user-defined AvgRef value is provided to the positive (+) input of a first amplifier 22, and the measured ValRef value is provided to the positive (+) input of a second amplifier 24. The implementation of FIG. 4A uses only two current mirrors instead of three, as in the implementation of FIG. 3A.

As shown in FIG. 4A, the output of first amplifier 22 is coupled to the gate of an NMOS transistor M22, whose source is coupled to ground through a resistor R23. The node between the source of transistor M22 and resistor R23 is coupled to the negative (−) input of first amplifier 22. The drain of transistor M22 is coupled to a first current mirror formed by PMOS transistors M24 and M25. The output of the first current mirror (i.e., the drain of transistor M25) is coupled to ground through resistor R28.

The output of second amplifier 24 is coupled to the gate of an NMOS transistor M27, whose source is coupled to ground through a resistor R26. The node between the source of transistor M27 and resistor R26 is coupled to the negative (−) input of second amplifier 24. The drain of transistor M27 is coupled to a second current mirror formed by PMOS transistors M29 and M30. The output of the second current mirror (i.e., the drain of transistor M30) is coupled to a node between the drains of transistors M22 and M24. The PkRef voltage value can be obtained from the node connecting the output of the first current mirror and resistor R28.

In FIG. 3A, the values "1×" and "0.5×" indicate the relative sizes of the transistors and the relative sizes of the resistors. Thus, for example, transistors M24, M25, M29 and M30 have approximately the same size. On the other hand, resistor R23 has about half the resistance as resistors R26 and R28, which in the illustrated example is assumed to be R. The circuit 30 generates an output voltage PkRef equal to about [(2*AvgRef)−ValRef].

Figure 4B:
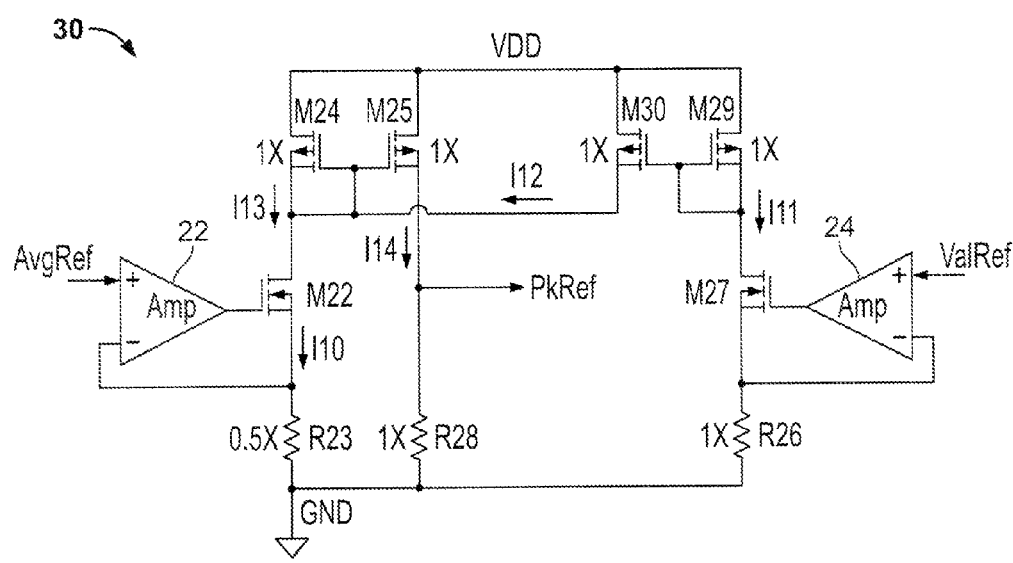

FIG. 4B illustrates further details of operation of the circuit of FIG. 4A. In particular, FIG. 4B illustrates various currents that are generated in the circuit. For example, first amplifier 22, transistor M22 and resistor R23 collectively generate current I10, where I10=(2*AvgRef/R). Second amplifier 24, transistor M27 and resistor R26 collectively generate current I11, where I11=ValRef/R. Additionally, second current mirror (i.e., transistors M29 and M30) generates current I12, where I12=ValRef/R.

As can be seen from circuit 30 in FIG. 4B, current I10=I12+I13. Thus, current I13=I10−I12=(2*AvgRef−ValRef)/R. Furthermore, the current I14 at the output from the first current mirror is the same as I13. Thus, I14= (2*AvgRef−ValRef)/R, and the voltage across resistor R28 is PkRef=(2*AvgRef−ValRef).

The voltage value PkRef from FIG. 4A (or FIG. 4B) can be used by control logic 16 as the threshold value to determine when to turn off transistor M1 (see FIG. 1). In particular, as explained above, when control logic 16 detects that the voltage across sensing resistor Rcs reaches the value PkRef, control logic 16 turns off transistor M1, thus ensuring that the average current flowing through the LED load 12 is substantially equal to the user-defined target value (AvgRef/Rcs).

Figure 5:
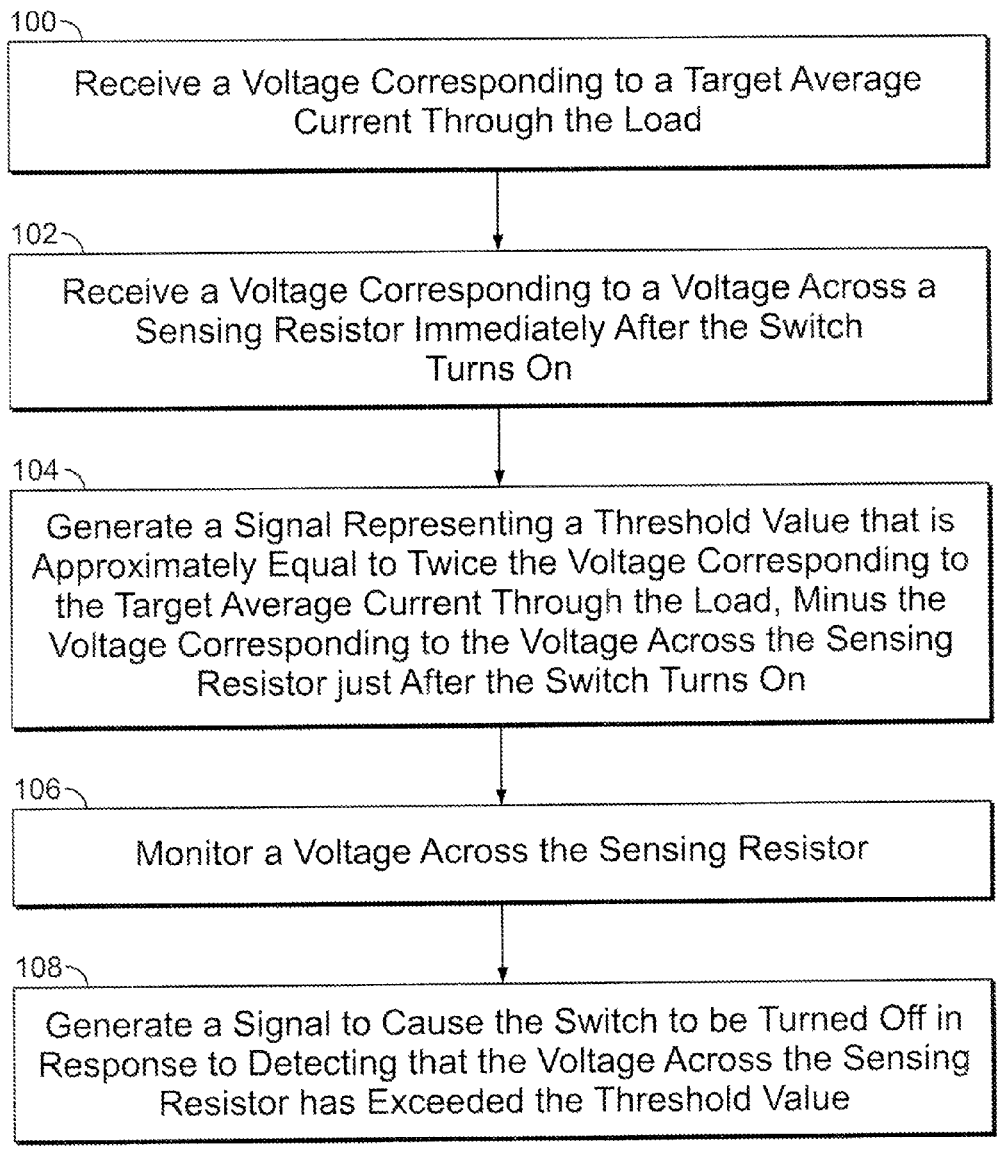
FIG. 5 is a flow chart illustrating a method of regulating peak current to achieve a specified average current through a load.

The foregoing circuits can thus be used in a method of controlling a switch in a power converter in which peak current is regulated to achieve a specified average current through a load. As indicated by FIG. 5, the method can include receiving a voltage corresponding to a target average current through the load (block 100) and receiving a voltage corresponding to a voltage across a sensing resistor immediately after the switch turns ON (block 102). The method further includes generating a signal representing a threshold value that is approximately equal to twice the voltage corresponding to the target average current through the load, minus the voltage corresponding to the voltage across the sensing resistor just after the switch turns ON (block 104). A voltage across the sensing resistor is monitored (block 106), and a signal is generated to cause the switch to be turned OFF in response to detecting that the voltage across the sensing resistor has exceeded the threshold value (block 108).

The described circuits thus can be used to control the average current to make it highly accurate. Compared to controlling the peak current, controlling the average current can, in some implementations, result in a more accurate and uniform average current value, despite variations in the values of external components. When controlling the peak current, the average current will tend to be lower than the controlled peak current by half of the ripple current (i.e., PkRef−ValRef), which may vary significantly because it depends on multiple parameters, such as switching frequency, external inductor value and input voltage. In contrast, the techniques described above can, in some cases, achieve an average current that varies little, if at all, with different switching frequencies, external inductor values or input values.

Although the foregoing examples are described in connection with a floating Buck converter, the techniques and circuits described here can be used with other types of switched power converters as well (e.g., forward converters). Also, although the circuits of FIGS. 3A and 4A include MOS transistors, other implementations can use other types of transistors (e.g., bipolar transistors).

Some implementations can achieve various advantages, such as obviating the need for a conventional control loop and compensation circuitry. Thus, in some implementations, design and application complexity can be reduced. Furthermore, some implementations can have a fast transient response such that average current control can be achieved within one switching cycle.

Other implementations are within the scope of the claims.
What is claimed is:
1. An apparatus comprising:
a load;
a switch having first, second and third terminals, the first terminal coupled to the load, the second terminal coupled to a sensing resistor, and the switch configured such that a signal applied to the third terminal opens the switch;
a switch driver having an output coupled to the third terminal; and
control logic operable, in response to a voltage across the sensing resistor exceeding a threshold value, to cause the switch driver to generate the signal, the threshold value based, at least in part, on a value corresponding to a target average current through the load and on a voltage across the sensing resistor, the signal opening the switch such that an average current flowing through the load is about equal to the target average current value, wherein the control logic is operable to generate the threshold value and comprises:

a first input to receive a voltage corresponding to the value that corresponds to the target average current;

a second input to receive a voltage corresponding to a voltage across the sensing resistor just after the switch is closed; and means to generate, in response to signals at the first and second inputs, a voltage corresponding to the threshold value.

2. The apparatus of claim 1 wherein the load comprises at least one LED.

3. The apparatus of claim 1 wherein the target average current through the load is a user-defined value.

4. The apparatus of claim 1 wherein the means to generate the voltage corresponding to the threshold value includes a plurality of current mirrors.

5. The apparatus of claim 1 wherein the control logic is operable to monitor the voltage across the sensing resistor.

6. A method of controlling a switch to achieve a specified average current through a load, the method comprising:

receiving a first voltage corresponding to a target average current through the load;

receiving a second voltage corresponding to a voltage across a sensing resistor just after the switch is closed;

generating a threshold voltage based, at least in part, on the first voltage and the second voltage;

monitoring a voltage across the sensing resistor; and generating a signal to cause the switch to be opened in response to detecting that the voltage across the sensing resistor has exceeded the threshold voltage.

7. The method of claim 6 including causing the switch to alternate between its open and closed states such that an average current flowing through the load is approximately equal to the target average current value.

8. The method of claim 6 wherein the threshold value is approximately equal to a difference between twice the first voltage and the second voltage.

9. The method of claim 6 wherein the target average current through the load is user-defined.

10. The method of claim 6 wherein the load includes at least one LED.

11. The method of claim 6 including causing the switch to be closed after a fixed amount of time.

* * * * *